United States Patent Office 3,681,083
Patented Aug. 1, 1972

3,681,083
METHOD OF MAKING SOUR DOUGH BREAD
Charles W. Everson, Warren, N.J., assignor to Merck & Co., Inc., Rahway, N.J.
No Drawing. Filed Feb. 27, 1970, Ser. No. 15,260
Int. Cl. A21d 8/04
U.S. Cl. 99—90 S — 3 Claims

ABSTRACT OF THE DISCLOSURE

Sour dough bread is produced by including in the dough ingredients the microorganism Pediococcus cerevisiae or Pediococcus acidilactici to produce lactic acid in the dough. The dough is permitted to rise for from ½ to 4 hours and then is baked.

PRIOR ART

Use of the organism in sausage manufacture.

This invention relates to bread making and particularly to sour dough of the kind used in making Jewish rye bread and French bread, and other sour dough breads.

The sour taste of these breads has generally been obtained by adding a crude culture or "starter" to the bread dough as its growth and fermentation in the bread dough causes the production of lactic acid. The use of a "starter" has been found satisfactory for this purpose as it satisfies the requirements of adequate growth at the customary bread-rising temperature and it generally produces a substantial amount of lactic acid and a minimal amount of objectionable secondary products. It is consequently possible to use such a small amount of it in the bread that its actual presence is not detected by the consumer. However, it has several serious drawbacks, one of which is requiring as much as 24 hours to produce enough lactic acid to impart the desired sour taste to the dough. Also, it may produce variable results and it is difficult to maintain.

In accordance with the present invention, it has been found that the microorganism Pediococcus cerevisiae or Pediococcus acidilactici which is sold under the trademark Lactacel by Merck and Co. Inc. is an excellent producer of lactic acid. Moreover, it has the unexpected properties of producing a large amount in about four hours at the ordinary temperature at which bread rises. This Lactacel is used at present in sausage manufacture but its value in making sour dough bread has not been realized prior to this invention.

The microorganism P. cerevisiae is readily obtained by purchasing the aforesaid Lactacel or it may be obtained from one of the recognized microorganism culture respiratory groups. This is true of P. acidilactici.

In using it to make sour dough bread from 2 to 8 ounces is added to 100 pounds of flour, depending on the desired extent of sourness of the baked bread. If the frozen preparation Lactacel is used it preferably is initially thoroughly intermixed with the water to both thaw it and get a suspension and any suitable conventional mixer may be used. This suspension is then combined with other ingredients commonly used in making the dough. The dough is put in the ordinary raising baking pans.

It is advisable that during rising the dough be kept at a temperature of about 85° F. as this insures good fermentative growth and lactic acid yield but it can be considerably higher, even up to 115° F. or so. The highest temperature is that which will adversely reduce the growth of the yeast.

A further feature of the invention involves the optional addition of dextrose into the dough as it accelerates the initial growth of the organism. If it is added, between 8 and 16 ounces of dextrose would be added per 100 pounds of flour so that it is intermixed with the organism. This relatively small amount of added dextrose is sufficient as during the dough kneading and rising steps additional dextrose is produced by the naturally occurring hydrolysis of other added saccharides.

Additionally, it has been found that the use of dried yeast instead of moist yeast gives a faster growth of the organism. Consequently, dried yeast may be substituted for a part of or all of the moist yeast ordinarily used.

The invention can be applied in making dough directly or to the so-called separate sponge and subsequent dough making operation. In the above examples, P. cerevisiae or P. acidilactici or mixtures of them in any relative proportions may be substituted for the Lactacel, weight for weight. Representative examples are the following:

Example I.—Jewish sour rye bread

Sponge:
    28 lbs. 8 oz. rye flour
    14 lbs. 8 oz. strong spring wheat clear flour
    9 oz. yeast
    1 lb. dextrose
    4 oz. Lactacel
    28 lbs. water Method: Mix just until smooth. Ferment at 80–85° F. for 2–4 hours depending upon degree of sourness desired in bread.

Dough:
    30 lbs. water
    28 lbs. rye flour
    30 lbs. spring wheat flour
    1 lb. 8 oz. salt
    1 lb. ground Caraway seed Method: Add to sponge and mix until smooth. Allow to rest 30 minutes to one hour. Divide, round and allow to proof for 15–30 minutes. Form into loaves and bake as usual for this type of bread. The use of Lactacel eliminates the necessity of preparing and carrying the traditional sour dough as a starter culture.

The dextrose in this Example I may be reduced in amount down to zero.

Example II

Same as Example I except all ingredients are combined into a dough initially. Allow dough to ferment at 80–85° F. for approximately 2 hours and carry out subsequent operations as usual for this product. Increasing the Lactacel to 8 oz. may prove beneficial.

Example III.—French sour dough bread

Sponge:
    25 lbs. spring wheat flour
    15 lbs. water
    2 oz. Lactacel

Method: Mix and ferment at 80–85° F. for 1–2 hours depending upon degree of sourness desired.

Dough:
    75 lbs. flour
    47 lbs. water
    2 lbs. 12 oz. salt
    12 oz. yeast (may be omitted)

Method: Mix and proof for 30 minutes if yeast is used, 3–4 hours if yeast is omitted. Handle through forming and balsing operations as is normal for this product. The use of Lactacel eliminates the levain premiere ordinarily used.

Example IV

Same as Example III but combine all ingredients into dough initially and proof for 2–3 hours before forming into loaves. The use of 4 oz. of Lactacel may prove beneficial.

Example V

Same as Example I except sponge fermentation is carried out at 100–110° F. for ½–1 hour before dough is made up.

Example VI

Same as Example III except sponge is fermented for ½–1 hour at 100–110° F. before dough is made up.

Example VII.—Milwaukee dark rye bread

Sponge:
- 22 lbs. dark rye flour
- 43 lbs. water
- 3 lbs. yeast
- 6 oz. Lactacel
- ¼ oz. onion powder Method: Mix until smooth. Ferment at 80–85° F. for 3–4 hours depending upon degree of sourness desired.

Dough:
- 62 lbs. spring wheat first clear flour
- 16 lbs. dark rye flour
- 35 lbs. water
- 2 lbs. 8 oz. salt
- 1 lb. 4 oz. shortening
- 1 lb. Caraway seed Method: Add to sponge and mix just until smooth. Allow 15–30 minutes rest before dividing and rounding.

After 15 minute proof, shape into loaves and proof for 30 minutes. Cut loaves as desired and bake at 475° F. with steam throughout baking period. The use of Lactacel replaces the preparation of the traditional sour.

I claim:

1. A method of making a baked, sour dough bread which comprises making a mixture of flour, water in an amount sufficient to produce a sponge or dough, and a fermentative organism amounting to 2 to 8 ounces per hundred pounds total of flour in the bread, said organism being selected from the group consisting of *P. cerevisiae* and *P. acidilactici* and their mixtures, permitting the dough to rise by maintaining said mixture at from 80° to 115° F. for from ½ to 4 hours, thereby insuring good fermentative growth and lactic acid yield, and baking said dough.

2. The method according to claim 1 in which dextrose is added into the mixture in an amount sufficient to accelerate the initial growth of the organism.

3. The method according to claim 1 in which yeast is added into the mixture.

References Cited

UNITED STATES PATENTS 3,034,896   5/1962   Humphreys et al. __ 99—90 S X

OTHER REFERENCES

Sultan: "Practical Baking," Avi Publishing Co., Inc., 1965, pp. 101–102.

RAYMOND R. JONES, Primary Examiner

J. R. HOFFMAN, Assistant Examiner